(12) United States Patent
Galan et al.

(10) Patent No.: US 8,971,456 B2
(45) Date of Patent: Mar. 3, 2015

(54) APPARATUS AND METHOD FOR A DUAL WATCH RECEIVER

(75) Inventors: Ariel L. Galan, Fort Lauderdale, FL (US); Young-Seo Park, Tamarac, FL (US); Charles H. Carter, Sunrise, FL (US); Charles R. Ruelke, Margate, FL (US); Darrell Stogner, Plantation, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 568 days.

(21) Appl. No.: 13/329,691

(22) Filed: Dec. 19, 2011

(65) Prior Publication Data

US 2013/0156134 A1    Jun. 20, 2013

(51) Int. Cl.
*H04L 27/06* (2006.01)

(52) U.S. Cl.
USPC ........... 375/340; 375/345; 375/346; 375/347; 375/349

(58) Field of Classification Search
CPC .. H04B 1/0007; H04B 1/0071; H04B 10/677; H04L 27/22; H04L 27/06; H04L 27/2649; H04W 84/08
USPC .................. 375/316, 324, 340, 345, 346, 350
See application file for complete search history.

(56) References Cited

U.S. PATENT DOCUMENTS

| | | | |
|---|---|---|---|
| 5,644,260 A | 7/1997 | DaSilva et al. | |
| 5,694,093 A | 12/1997 | DaSilva et al. | |
| 6,122,271 A | 9/2000 | McDonald et al. | |
| 6,157,616 A | 12/2000 | Whitehead | |
| 6,421,397 B1 | 7/2002 | McVey | |
| 6,574,286 B2 | 6/2003 | McVey | |
| 6,611,536 B1 | 8/2003 | Ahmed | |
| 6,618,096 B1 | 9/2003 | Stapleton | |
| 6,714,259 B2 | 3/2004 | Kim | |
| 6,721,398 B1 | 4/2004 | Pitcher | |
| 6,798,844 B2 | 9/2004 | Ratto | |
| 6,807,528 B1 | 10/2004 | Truman et al. | |
| 6,819,706 B1 | 11/2004 | Lim | |

(Continued)

FOREIGN PATENT DOCUMENTS

| | | | |
|---|---|---|---|
| EP | 2068452 A2 | 6/2009 | |
| WO | 2005083944 A1 | 9/2005 | |
| WO | 2008070777 A2 | 6/2008 | |

OTHER PUBLICATIONS

U.S. Appl. No. 12/951,235, filed Nov. 22, 2010.

(Continued)

*Primary Examiner* — Shuwang Liu
*Assistant Examiner* — David S Huang
(74) *Attorney, Agent, or Firm* — Barbara R Doutre (57) ABSTRACT

A receiver for a wireless communication device provides a dual path receiver receiving first and second protocol-agnostic, uncorrelated receive signals simultaneously. The dual path receiver generating first and second offset IF signals from the simultaneously received first and second protocol-agnostic, uncorrelated receive signals. The receiver utilizes at least one converter for converting the first and second offset IF signals into at least one serial synchronous interface (SSI) signal representing the spectrum at IF. At least one processor receives the at least one SSI signal and applies parallel processing paths to demodulate the at least one SSI signal into separate baseband signals. The processor provides interference detection of, and level control for, the first and second offset IF signals.

19 Claims, 5 Drawing Sheets

(56) References Cited

U.S. PATENT DOCUMENTS

| | | |
|---|---|---|
| 7,499,441 B2 | 3/2009 | Wiatrowski et al. |
| 7,689,187 B2 | 3/2010 | Galan |
| 8,014,385 B2 | 9/2011 | Kang et al. |
| 8,135,425 B1 | 3/2012 | Banik et al. |
| 2003/0056221 A1 | 3/2003 | Zhang et al. |
| 2004/0142723 A1 | 7/2004 | Shippee |
| 2004/0225494 A1 | 11/2004 | Mayginnes et al. |
| 2006/0291428 A1 | 12/2006 | Filipovic |
| 2007/0093227 A1 | 4/2007 | Lieback et al. |
| 2007/0189419 A1 | 8/2007 | Filipovic |
| 2007/0281617 A1 | 12/2007 | Meylan et al. |
| 2008/0233875 A1 | 9/2008 | Desai et al. |
| 2010/0048157 A1 | 2/2010 | Carrera |
| 2010/0194582 A1 | 8/2010 | Petite |
| 2011/0097998 A1 | 4/2011 | Ko et al. |
| 2011/0274080 A1 | 11/2011 | Ko et al. |
| 2012/0046000 A1 | 2/2012 | Gao et al. |
| 2012/0129480 A1 | 5/2012 | Ruelke et al. |
| 2012/0155295 A1 | 6/2012 | Trainin |
| 2012/0163309 A1 | 6/2012 | Ma et al. |
| 2012/0163508 A1 | 6/2012 | Kuffner et al. |
| 2012/0164948 A1 | 6/2012 | Narasimha et al. |
| 2012/0276938 A1 | 11/2012 | Wagholikar et al. |
| 2013/0170439 A1 | 7/2013 | Anderson et al. |
| 2013/0242860 A1 | 9/2013 | Kim et al. |
| 2014/0146683 A1 | 5/2014 | Stogner et al. |

OTHER PUBLICATIONS

U.S. Appl. No. 12/979,133, filed Dec. 27, 2010.
Corresponding International Application No. PCT/US2012/065871—International Search Report dated Apr. 24, 2013.
PCT International Search Report Dated Apr. 29, 2014—PCT/US2013/070658 (U.S. Appl. No. 13/687,495).
Non-Final Office Action mailed Jun. 16, 2014, in U.S. Appl. No. 13/687,495, Darrell J. Stogner et al., filed Nov. 28, 2012.

APPARATUS AND METHOD FOR A DUAL WATCH RECEIVER

TECHNICAL FIELD

The present disclosure relates generally to communication systems and more particularly to receiver systems.

BACKGROUND

The need for a receiver capable of monitoring two or more channels simultaneously has been recognized for a long time. However, there are several known fundamental problems with the implementation of a simultaneous dual channel receiver, especially when using a single Analog to Digital Converter (ADC) to digitize both channels simultaneously. Besides size and cost obstacles, there are several technical hurdles to overcome. These technical obstacles for implementing a Dual Watch (DW) simultaneous receiver system (SRS) include: front end signal splitting to enable both in-band and cross-band simultaneous dual channel reception; interference signals proximate to the first desired DW channel being mixed onto the second DW channel as co-channel interferers (near-far blocking); strong-to-weak signal operating conditions where the far-out transmitter noise from the first desired DW channel is mixed into the second DW channel thereby deleteriously affecting the second DW channel's Signal-to-Noise Ratio (SNR); and insuring that the ADC dynamic range is not limited. The occurrences of audio holes (absence of audio) are also to be avoided. Audio holes may occur when the receiver is in scan mode, whereby the receiver is monitoring for activity on alternate channels as may be included within a predetermined list of scan channels, and reverting back to an active/default channel.

While an alternative DW-SRS approach would be to add a second receiver in parallel to the first receiver system already in the radio product, such an alternative would incur significant cost and associated parts count penalties, power consumption and size penalties which would compromise product form factor and profitability.

Therefore, an efficient dual channel receiver architecture is needed that satisfies the above requirements with reasonable cost and size tradeoffs.

BRIEF DESCRIPTION OF THE FIGURES

The accompanying figures, where like reference numerals refer to identical or functionally similar elements throughout the separate views, together with the detailed description below, are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Before describing in detail embodiments that are in accordance with the present invention, it should be observed that the embodiments reside primarily in combinations of apparatus components and method steps related to a simultaneous multi-channel receiver. The receiver provided herein enables mission critical and professional commercial (PCR) two-way radios to support receiving a first RF signal on a first RF channel modulated with a first information set while simultaneously receiving a second RF signal on a second RF channel modulated with a second information set. In one embodiment, the first RF signal being received on a first RF channel is different from the second RF signal being received on a second RF channel, the first information set is uncorrelated to the second information set, and the protocol for conveying the first information set is independent from, and unrelated to, the protocol for conveying the second information set. For the purposes of this application, the independent and unrelated protocols are considered protocol-agnostic. In a second embodiment, the first and second RF signals may be the same; however the RF signals are received on spatially different antennas or by another means that introduces a fixed phase difference or other fixed relationship between the first information set and the second information set, thereby functioning in a diversity receive mode of operation. The receiver architecture provided herein applies to multi-band and multi-protocol receivers.

The multi-channel receiver operating in a manner to be described herein provides a significant positive impact in several areas of radio technology, operation, and features. One important application is scan mode, wherein a dual channel receiver can continuously monitor activity in one channel while simultaneously receiving a desired on channel signal communicated on another channel, thereby effectively eliminating "audio holes" which occur in today's present technology. In traditional single channel receivers, audio holes, or absence of audio, occur when the active frequency of the receiver is periodically changed to that of priority channels in a scan list in order to check for activity. The duration of the absence of audio is proportional to the length of the scan list and rate of monitoring. For the purpose of this invention, scan mode may include, but is not limited to, a means whereby a plurality of receiver channels are cyclically monitored in a predetermined sequence for the presence of a desired received signal (conventional scan), a priority channel is continuously checked at a higher monitoring rate while cyclically monitoring a predetermined sequence of received channels (priority scan), or where different control channels from various systems are monitored for desired receive signals (mobility scan). Additionally, the multi-channel receiver provides simultaneous multi-mode operation when one channel can simultaneously receive high speed digital information through a data protocol, for example, while the other channel receives mission critical audio on an analog FM signal. In trunked mode, one channel may constantly monitor control channel activity, while the second channel can deliver uninterrupted mission critical audio data. Another important application is in a diversity receiver environment where the same information set is captured by multiple antennas and/or at different frequencies on a single antenna and processed as independent channels in the RF section to improve receiver sensitivity.

For ease of explanation and illustration, the drawings and examples within this application are shown in the form of a dual-channel receiver, however it should be understood that the receiver can receive RF signals from more than two channels. Hence, the term multi-channel receiver is intended to encompass two or more channels. The receiver provided herein operates within radios with comply with stringent public safety specifications, such as TETRA (TErrestrial Trunked RAdio), APCO P25 (Association of Public Safety Communications Officials Project 25) and/or Professional Commercial Radios (PCR) two-way radios for the public safety, government and enterprise customers worldwide. For the purposes of this application, a narrowband receiver is thus considered to be operating within an RF frequency range of 100 MHz to 1200 MHz having channel spacing of less than 150 kHz, and typically 25 kHz, 20 khz, or 12.5 kHz channel spacing. The DW-SRS can adopt either a Direct Conversion Receiver topology (DCR) or a Dual Conversion topology; however, whether DCR or Dual conversion, the receiver topology will include band specific receiver front end stages for isolating the desired first and second RF signals as will be described subsequently herein. The DW-SRS will also have parallel operations in a processor stage so as to process both the first and second received signals simultaneously.

Figure 1:
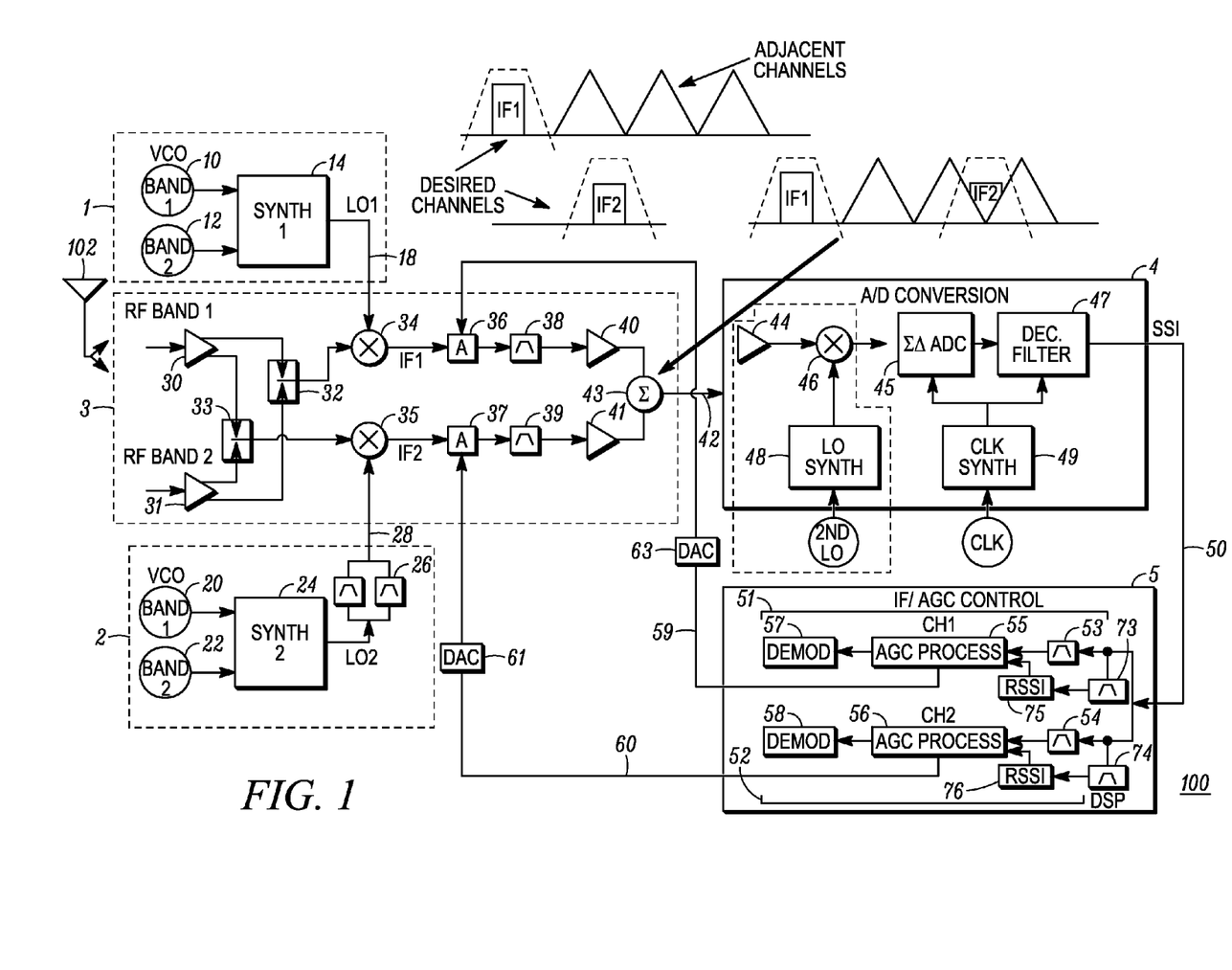
FIG. 1 illustrates a diagram of a dual watch simultaneous receiver system (DW-SRS) incorporating a dual conversion receiver in accordance with an embodiment.

FIG. 1 is a diagram of a dual watch simultaneous receiver system (DW-SRS) 100 incorporating a dual conversion topology operating in accordance with the various embodiments. Receiver 100 is part of a radio for use in public safety, government and enterprise environments as described previously. The receiver 100 receives an incoming RF signal 102 operating over more than one band in the public safety band and can include any type of information, even uncorrelated information, such as voice and data over the different bands. The RF signal 102 is separated into its constituent RF bands (RF band 1, RF band 2, etc) by a diplexer (not shown) for simultaneous application to dual channel receiver 3. These two RF input signals may fall within a single common band or any two different bands as may be incorporated into the public safety spectrum allocation.

In accordance with an embodiment, receiver 100 is divided amongst five major functional blocks comprising: a first Local Oscillator generator 1 for generating a first injection signal (LO1) 18, a second LO generator 2 for generating a second injection signal (LO2) 28, a simultaneous dual-channel receiver 3, an analog-to-digital converter (ADC) system 4, and an automatic gain (AGC) control 5. AGC control block 5 may be a dedicated circuit, or may be incorporated into a digital signal processor block. For ease of explanation, a simultaneous dual channel receiver 3 is shown and described which, as previously mentioned, can be extended to greater than two channels, and can incorporate either a DCR configuration, Dual conversion configuration (shown) or a combination of both. For the purposes of this invention, the term Intermediate Frequency (IF) may be defined to include signals ranging from baseband spectral frequencies of DC to several hundred kHz for DCR architectures, or alternatively may range from 10 MHz to 150 MHz for Dual conversion topologies. In either DCR or dual conversion topology, the novel elements of the present DW-SRS are the same as described herein. Each block will be described.

Independent LO generators 1 and 2 are used to control first and second LO injections 18 and 28 to dual channel receiver 3. LO generator 1 may comprise a plurality of Voltage Controlled Oscillators (VCO) as represented by a first VCO to generate a first VCO signal 10 in a first VCO band (VCO Band 1) and a second VCO to generate a second VCO signal 12 in a second VCO Band (VCO Band 2). The VCO signals 10, 12 (from VCO Band 1 and VCO Band 2) are applied to a synthesizer 14 to generate the first injection signal (LO1) 18. Synthesizer 14 generates LO injection outputs across a first desired operating band. The first injection signals (LO1) 18 are applied to a first down-mixer 34 of DW receiver 3.

The second LO generator 2 may comprise a plurality of Voltage Controlled Oscillators (VCO) as represented by a first VCO to generate a first VCO signal 20 in (VCO Band 1) and a second VCO to generate a second VCO signal 22 in (VCO Band 2). The VCO signal 20 from VCO Band 1 and the VCO signal 22 from VCO Band 2 are applied to a second synthesizer 24. The output of synthesizer 24 is filtered via filters 26 to provide LO injection outputs across a second desired operating band to provide the second LO injection signal 28 to a down-mixer 35 of DW receiver 3.

Again, the RF signal 102 is diplexed into its different bands (RF band 1, RF band 2) for simultaneous application to dual channel receiver 3. In operation, the first RF signal 1 from RF band 1 is applied to a first dual output low noise amplifier 30, and RF signal 2 from RF band 2 is applied to a second dual output low noise amplifier 31. Front end splitting and combining is performed with single-pole double-throw (SPDT) switches 32, 33 or other suitable switching technology. As mentioned previously, RF bands 1 and 2 comprise any two bands across the public safety bands. The front end switches 32, 33 switch between three conditions. Dual channel receiver 3 selectively operates under three (3) operating conditions, in which:

switches 32 and 33 are set such that the input signals to mixers 34 and 35 are from within a first band, RF band 1;

switches 32 and 33 are set such that the input signals to mixers 34 and 35 are from within a second band, RF band 2; or switches 32 and 33 are set such that the input signals to mixers 34 and 35 are from different bands, one from each of RF band 1 and RF band 2.

Under all switch conditions, the output signal from switch 32 (RF1) is applied to mixer 34 to be down converted to a first IF signal (IF 1) by mixing RF 1 with LO1 injection signal 18. The output signal from switch 33 (RF 2) is applied to mixer 35 to be down-converted to generate a second IF signal (IF 2) by mixing RF2 with LO2 injection signal 28. Signal IF 1 may be level controlled at 36 (attenuation or gain). The level control is set by the IF/AGC control 5. Signal IF2 may be attenuated independently at level controlled at 37 (attenuation or gain). The level control is also set by the IF/AGC control 5. Signal IF 1 gets filtered through first bandpass filter (BPF) 38 to generate a first filtered IF 1. Signal IF 2 gets filtered through second bandpass filter (BPF) 39 to generate a second filtered IF 2 signal. The filtered IF 1 signal gets amplified at first amplifier 40 to generate a first amplified IF1 signal. The filtered IF 2 signal gets amplified at second amplifier 41 to generate a second amplified IF2 signal. Amplified IF1 signal and amplified IF2 signal are combined at summer 43 to generate a Combined Intermediate Frequency (CIF) signal 42 covering a CIF Spectrum incorporating both the first and second amplified signals IF1 and IF2 signals respectively. The CIF contained in signal 42 is then applied to the Analog-to-Digital Converter (ADC) circuitry 4.

In accordance with the various embodiments, the first and second IF signals IF1 and IF2 that are embedded in CIF signal 42 are spectrally offset so as to provide sufficient isolation and attenuation of undesired interference signals so as to differentiate the first desired information set contained in IF1 from the second desired information set contained in IF2. Within the spectral offset separating IF1 and IF2, there may be undesired interference signals from other transmitters or radios, where these interference signals may be located at any channel proximate to IF1 or IF2 so as to introduce co-channel interference with a desired signal. Co-channel interference is defined as interference that is co-located within the same channel as a desired signal and serves to degrade the SNR of the desired signal. Accordingly, the spectral offset between desired signals IF1 and IF2 is usually selected so that it is not an integer multiple of the channel spacing, or integer related to the actual IF frequencies IF1 or IF2. The composite CIF signal 42 may contain any combination of voice and data information from a first channel (channel 1) and data and voice information from a second channel (channel 2) which are combined at summer 43. For example, an IF separation near 100 kHz may provide approximately 60 dB of IF crystal filter attenuation to interference located at an offset corresponding to the second desired signal relative to a first desired signal. Combined with an estimated 20 dB adjacent channel energy reduction resulting from non-integer IF separation, blocking performance of nearly 80 dB can be achieved without AGC. Accordingly, the selected spectral difference reduces the opportunity for interference energy proximate to IF1 to couple onto the desired signal of IF2, or vice versa, as shown in FIG. 1.

Extending beyond two paths, the multi-channel receiver provides simultaneous reception of a plurality of desired signals, each desired signal occupying a designated desired channel, each desired channel having a desired channel spacing. Each desired channel is governed by a plurality of protocols, each protocol being agnostic to, and independent of, other protocols that govern other desired channels within the multi-channel receiver. The multi-channel receiver generates a plurality of IF signals, each IF signal being associated with a specific desired channel. The paths may extend to a plurality of IF paths for processing the plurality of IF signals, each IF path having a unique desired IF frequency, each IF path being independent of the other IF paths, each IF path incorporating at least one IF filter and at least one IF automatic gain control (IF AGC). A frequency difference between any given pair of desired IF frequencies being different from the other desired IF frequencies by an amount proportional to a non-integer multiple of the desired channel spacing, thereby minimizing interference from channels proximate to other desired IF frequencies contained within the plurality of IF paths. The IF AGC for each IF path is controlled independently for level controlling the plurality of IF signals.

To summarize the operation of block 3, the first and second RF bands are directed through first and second receiver paths respectively while first and second LO injection signals 18, 28 are injected into each path to drive first and second mixers 34, 35, thereby generating first and second IF signals. The first and second IF signals are independently level controlled 36, 37 (voltage controlled attenuators/gain) and filtered through first and second IF crystal filters 38, 39. The outputs of the crystal filters 38, 39 are then amplified at amplifiers 40, 41 and summed at summer 43. The CIF signal 42 includes both desired signals IF1 and IF2 having sufficient spectral offset separation so as to minimize potential co-channel interference between one another. It is this co-channel interference mechanism which receiver 100 controls so as to minimize associated degradations in desired signal SNR. Thus, simultaneous dual-channel receiver 3 enables dual watch of two independent RF signals located either within a common RF band or located in two different RF bands without degradation of performance. Furthermore, when embodied for two or more channels, the simultaneous multi-channel receiver 3 enables multi watch of a plurality of independent RF signals located either within a common RF band or located in a plurality of different RF bands without degradation of performance.

In accordance with the various embodiments, the level controlling 36, 37 can be take place elsewhere along the receiver paths, such as post-amplification 40, 41 depending on system applications and design layout.

Moving to block 4, the CIF signal 42 is applied to A/D conversion system 4. The separate level controls 36, 37 and IF filters 38, 39 keep a strong channel from overloading or compressing the ADC 45 and thereby prevent degradation of the overall DW-SRS 100 operation. Independent AGC level controls 36 and 37 also help to prevent sideband noise of a strong interference signal from coupling into the desired on-channel signal and thereby reduce the on-channel signal's SNR (signal-to-noise ratio). The separation of the IF frequencies is chosen based on the attenuation capability of crystal filter technology so that adjacent channel specifications are met with a minimum of combined channel bandwidth.

The A/D conversion system 4 takes the analog CIF signal 42 and converts it to a digital signal 50, referred to as a serial synchronous Interface (SSI) signal 50 representing the combined IF signal 42. The analog-to-digital conversion can be applied to both DCR and dual conversion receivers. For a direct conversion application, the CIF signal 42 is sampled, for example, at ADC 45 at a sample rate proportional to clock synthesizer 49 so as to produce a digitized sampled signal. This sampled signal at the output of ADC 45 is then divided down via decimation filter 47, and may be processed by other digital blocks (not shown) to produce the digital signal 50 representing a sampled received signal of the combined spectrum at IF.

Alternatively for dual conversion applications, the receiver 100 further comprises additional amplifier 44, mixer 46, and another LO synthesizer 48. The bandwidth of IF spectrum applied to amplifier 44 is selected such that the combined spectrum of IF1 and IF2 (including spectral offset separation) is acquired. For the dual conversion application, the CIF signal 42 is mixed at mixer 46 with a synthesized LO signal from LO synthesizer 48 to produce a secondary IF signal. This secondary IF signal is sampled (in accordance with the sampling rate of clocked synthesizer 49) to produce a digital signal which is then decimated through decimation filter 47 to produce the digital signal 50 in the form of a serial synchronous signal of combined spectrum at IF. Alternatively, IF1 and IF2 signals can be applied to ADC system block 4 as separate signals into two separate amplifier and mixer blocks, such as 44 and 46 can be moved so as to sum the outputs of the mixers prior to digitally sampled at ADC 45.

Both direct conversion and dual conversion embodiments use CLK 49 and decimation filter 47; however, the sample rate as set by CLK 49 and the decimation rate at block 47 may be different for the DCR or dual conversion topologies.

The output frequency from clock synthesizer 49 is used to generate a sampling signal for the A/D conversion 45 (in either direct or dual conversion applications). In the accordance with the various embodiment, the sampling rate is set to at least twice the digitizing bandwidth of the IF spectrum to satisfy the Nyquist sampling criterion. For example, for a DW-SRS containing two active received signals, each active receive signal occupying a unique channel, each channel having a unique channel BW, which are subsequently combined together with appropriate offsets to form a composite IF signal at the output of mixer 46 having a cumulative equivalent noise BW of 150 kHz at the input to ADC 45, then the sampling rate of ADC 45 that meets a minimum Nyquist system requirement so as to preserve the first and second received modulated information will be at least 300 ksps.

Accordingly, the sampling rate of the ADC 45 is much higher than existing single channel receivers and chosen to digitize the combined dual channel bandwidth, thereby acquiring both channels simultaneously. Any associated increase in the ADC noise figure due to the higher sample rate can be compensated for with additional take over gain from an IF amplifier as needed. Decimation filter 47 is used to rescale the rate of sampled output at the ADC 45 so as to provide a decimated sample rate at the output decimation filter 47 for post-processing and formatting and for subsequent conveyance to DSP block 5.

At Digital Signal Processing (DSP) block 5, the sampled composite IF signal is first processed so as to generate a plurality of individual sampled received signals for each received signal being processed by the SRS. For a DW-SRS, the generation of individual sampled received signals representing IF1 and IF2 will be described in detail in FIG. 3, but generally includes processing at bandpass filter (BPF) blocks 53 and 54 respectively. Each BPF block produces a filtered, independently sampled (samples rates for BPF 53 and 54 may be different) received signal representing only one of the received signals being simultaneously processed by the DW-SRS. Intermediate Frequency (IF) AGC control blocks 55 and 56 subsequently process each of the sampled received signals from BPF 53 and 54 respectively, so as to provide digital control signals 59 and 60 which are proportional to the amplitude of the first and second desired IF signals IF1 and IF2 respectively. The digital control signals 59 and 60 are proportional to a calculated estimate of the received signal strength (RSS) for each desired received signal contained in the CIF signal 42. This means that a separate, independently calculated RSS value is calculated for each of the received signals IF1 and IF2 being processed by the SRS.

In addition to the on channel RSS blocks for IF1 and IF2, a second set of bandpass filters (BPF) for IF1 and IF2 73 and 74, each having a wider passband response than its companion BPF 53 and 54 respectively, allow additional spectrum proximate to signals IF1 and IF2, including undesired adjacent channel interference signals. The BW for BPF 73 is directly proportional to the BW of BPF 53, and the BW of BPF 74 is directly proportional to BW of BPF 54. Two more digital control signals 75 and 76 proportional to the received signal strength of the desired signals IF1 and IF2 and undesired signals proximate to IF1 and IF2 are provided to the IF AGC control blocks 55 and 56 respectively. The IF AGC control blocks infer from the absence of a strong desired on-channel signal in 55 and/or 56 plus the presence of a strong signal in 75 and/or 76 that a strong interfere signal is present for IF1 and/or IF2 respectively. When only a strong interferer is present in one IF path maximal attenuation can be engaged to optimize performance in the other IF path.

Subsequent to simultaneously processing the sampled received signals at AGC control blocks 55 and 56, the received signals may be processed by any other digital processing as may be required to support a particular radio application, including tandem demodulation of the received signals at demodulator blocks 57 and 58. The IF AGC control 5 may be part of a DSP which generates control signals 59 and 60 that in turn control Digital-to-Analog converters (DAC) 63 and 61 so as to independently adjust IF gain or attenuation at blocks 36 and 37 respectively. The AGC system is optimized to maintain signal to noise ratio (SNR) of a plurality of desired received signal incorporated into the CIF signal 42.

Accordingly, DSP 5 incorporates a first path 51 comprising BPF filter 53, AGC thresholding block 55 and demodulator 57. Second path 52 comprises BPF filter 54, AGC thresholding block 56, and demodulator 58. First path 51 filters at 53 the digital signal 50 so as to provide a sampled signal representing received signal IF 1 and then calculates, via received signal strength indicator (RSSI) function contained in block 55, a RSSI proportional to the received signal power for the first channel (CH 1). The sampled signal representing received signal IF1 is demodulated at demodulator 57 into a baseband signal and may be further processed as appropriate for supporting a first application communicating a first information sequence to the end user. Second path 52 filters the digital signal 50 to provide a sampled signal representing received signal IF2 and then calculates, via RSSI function contained in block 56, a RSSI proportional to the received signal power for the second channel (CH 2). The sampled signal representing received signal IF2 signal is demodulated at demodulator 58 into baseband and may be further processed as appropriate for supporting a second application communicating a second information sequence to the end user. The IF AGC control blocks 55 and 56 thus maintain SNR along signal paths 51, 52 back to the respective level controls 36 and 37 of dual channel receiver 3. Thus, the attenuation of dual channel receiver 3 is set by the IF AGC control blocks 55 and 56. The proper AGC action provided by DSP 5 prevents the near-far limitations associated with previous receivers. Importantly, optimal SNR of the IF signals relies on separate AGC control, and may also incorporate other control systems not shown, such as independent automatic frequency control (AFC), and independent on-channel carrier detect (CD) for signals IF1 and IF2 respectively.

Independent AFC of the received IF signals IF1 and IF2 is achieved by independently adjusting the LO injection signals 18 and 28 respectively, so as to minimize frequency netting errors from the desired IF frequencies IF1 and IF2. Frequency netting error for the purposes of this application is defined as cumulative frequency error between assigned transmit and receive operating frequency and the actual transmit and receive operating frequency. Each IF signal frequency is adjusted based on error signals generated within DSP block 5 (not shown), with AFC update rates and frequency step sizes for received signal IF1 and IF2 being independent and uncorrelated from each other.

Independent CD of the received IF signals IF1 and IF2 is achieved by processing the on-channel signals for IF1 and IF2 to detect coherent on channel signals having appropriate correlation factor indicators so as to indicate the presence of a desired on-channel signal IF1 and/or IF2 independently. Said CD processing for IF1 and IF2 is done at a designated CD detection block (not shown) that operates in tandem with other DSP processing blocks so as to provide indication of the presence of a desired on-channel signal. Each IF signal frequency may be processed using unrelated CD algorithms, update rates and/or threshold settings for received signal IF1 and IF2

Thus, DSP 5 allows each channel to be independently processed and demodulated, while allowing tandem AGC, AFC and CD processing of the plurality of desired received signals used in communicating parallel information sequences to the end user as may be required, This means that a radio can now demodulate a plurality of channels simultaneously, from any band or from any uncorrelated protocol. For example, for a DW-SRS, any two signals spectrally located in any given band (VHF, UHF, 700 MHz and/or 800 MHz) may be received, each signal being communicated using any one of a plurality of protocols, including, APCO, TETRA, iDEN, GSM, and/or analog FM, using receiver 100 having multi-channel capability. Additional channels can be demodulated in a similar manner by adding identical blocks to mixer 35, level control 37, filter 39, and amplifier 41 while switches 32 and 33 can be replaced by versions having more inputs such as single pole triple throw types in a three channel application for example. In this particular case, three channels would be summed and combined at summer 43 prior to Analog to Digital Conversion in block 4

Receiver 100 thus provides an improved front end using the splitting and switching taking place in dual channel receiver 3, which allows for simultaneous dual channel reception within the same band and across bands. Interference caused by undesired cross-coupled signals (spurious response signals) acting as co-channel interferes (near-far blocking) is minimized for each IF path by the use of strategic IF separation (non-integer multiple of channel spacing) for the IF crystal filters 38, 39. Dynamic range limitations of the ADC are now addressed by separate IF AGC control via level controls 36 and 37. The previously problematic strong-weak signal conditions (strong signal/far out noise) are resolved by the separate paths 51, 52 in IF AGC control via RSSI in AGC control blocks 55 and 56 respectively.

Figure 2:
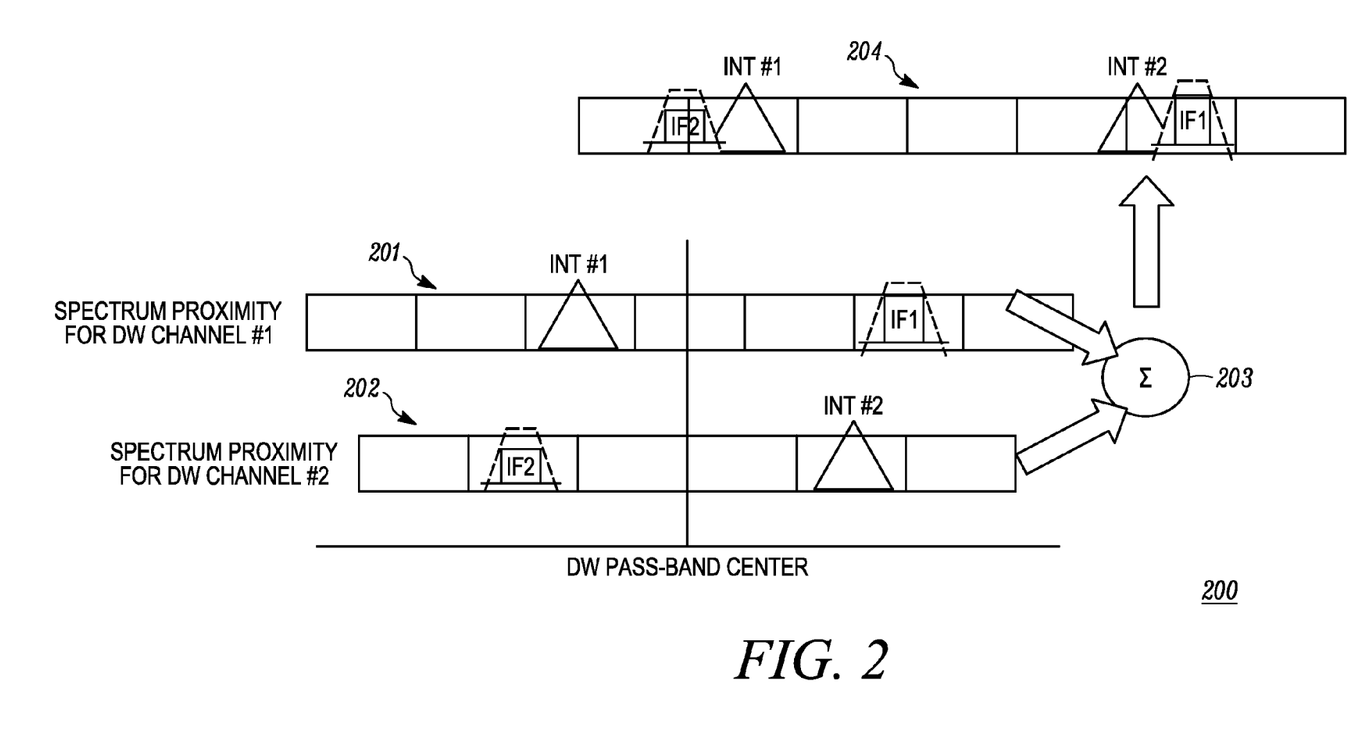
FIG. 2 illustrates the relative frequency offsets for the DW on-channel spectrum and off-channel spectral locations for the DW-SRS preferred embodiment.

FIG. 2 illustrates a preferred embodiment of the channel spectral positions 200 for a first desired received signal IF1 in a first IF branch comprising blocks 34, 36, 38, and 40, with respect to a second desired received signal IF2 in a second IF branch comprising blocks 35, 37, 39, and 41 respectively. Accordingly, LO injection signal 18 for the first IF signal IF1 and LO injection signal 28 for the second IF signal IF2 are set to maintain a relative spectral difference so as to allow the signal IF1 and IF2 to be summed together at summer 203 without loss of desired received information. This necessitates that the spectral separation between IF1 and IF2 are selected to minimize undesired spurious coupling from signals within alternate channels proximate to the first or second received signals IF1 and IF2 to become coupled into the desired receiver channels. In accordance with some embodiments, this requires that the spectral separation between IF1 and IF2 be sufficient to allow appropriate attenuation of the undesired signals in proximity to the desired signals IF1 and IF2. In addition, the spectral offset between IF1 and IF2 may not be an integer multiple of the channel spacing that are allocated within the spectral range proximate to signal IF1 or IF2. Accordingly, the frequency domain channel location 201 of channels proximate to IF1 and the frequency domain channel location 202 of channels proximate to IF2 are not in alignment with respect to the channel boundary. This facilitates minimizing undesired spurious coupling between IF signal paths when the first spectral range 201 is summed with the second spectral range 202 at summer 203. Note summer 203 of FIG. 2 corresponds to summer block 43 in FIG. 1. The composite IF signal 42 of FIG. 1 is represented by the composite spectral response 204 of FIG. 2.

Figure 3:
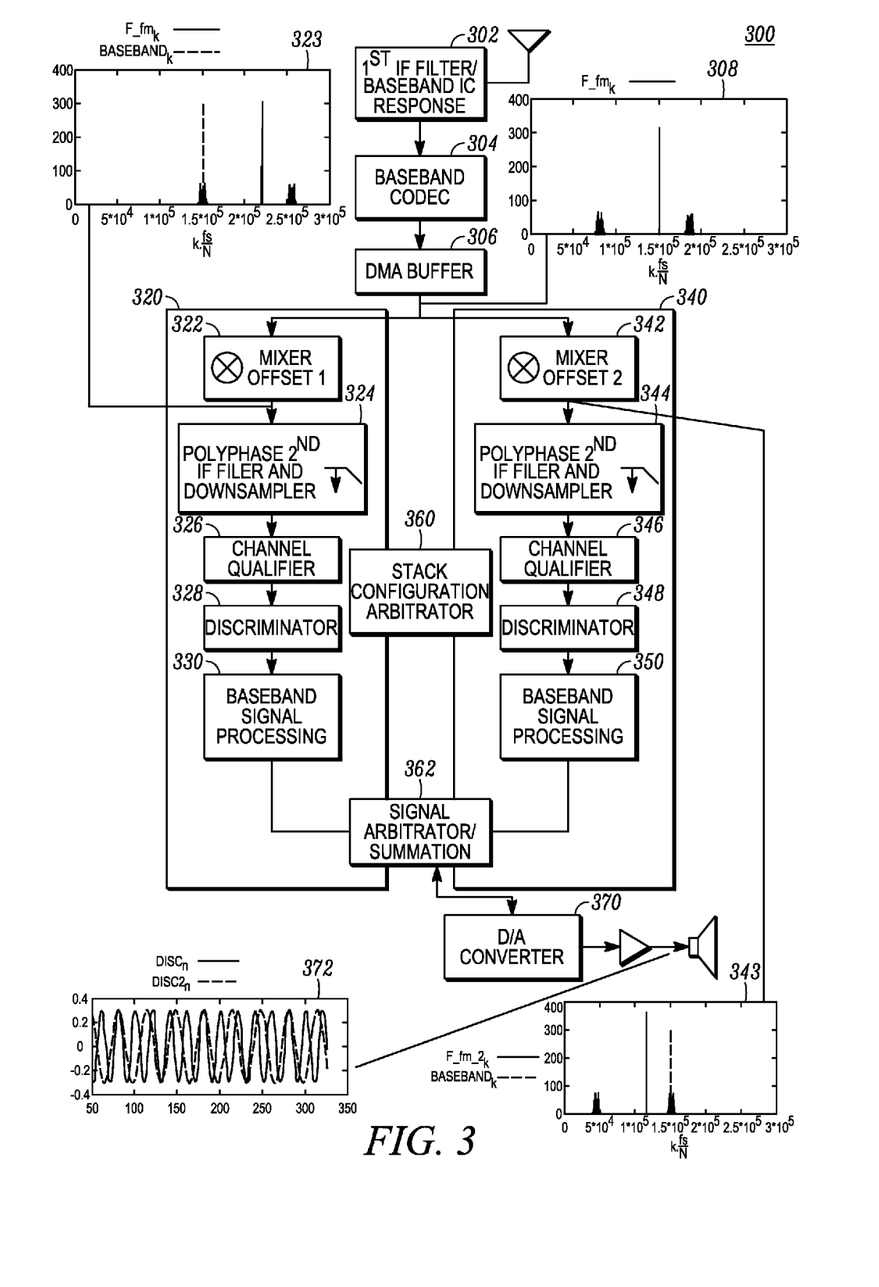
FIG. 3 illustrates the parallel software architecture for simultaneous processing of uncorrelated received signals within the DW-SRS.

FIG. 3 is an illustration of a software or DSP processing architecture 300 for processing a multi-channel receiver in accordance with an embodiment. While FIG. 3 is used to illustrate a preferred embodiment, many adaptations and modifications can be introduced in the software strategy represented in FIG. 3 without departing from the novelty contained therein. FIG. 3 describes a DW-SRS receive operation, but it can be readily expanded to cover any number of receive channels. It also illustrates the reception of a standard FM analog channel. However, this can readily be extended to cover any number and combination of digital and/or analog centric protocols.

Front end signal processing is represented by a first IF filter generating a baseband response at 302, and the baseband response being digitized at 304, for example by a processing block encoder/decoder type device, such as a CODEC. Block 302 may generally include ADC processing block 4 of FIG. 1 and/or other digital blocks not shown as may be necessary for proper digital formatting and processing of the CIF signal 42. The digitized waveform is stored in direct memory access (DMA) buffers 306, and represents the input to the parallel processing system of the multi-channel digital processing architecture. Thus, first IF filtering and anti alias filtering have been accomplished in the front end of the receiver and within the baseband CODEC. As illustrated within FIG. 3, there exist a plurality of parallel processing stacks 320 and 340, each incorporating a plurality of processing blocks as may be necessary for processing a particular desired on-channel signal as dictated by the particular protocol governing said received signal. For illustrative purposes, processing stack 320 comprises complex mixer block 322, IF filter block 324, such as a poly-phase second IF filter a down-sampler, channel qualifier 326, discriminator 328 and baseband signal processor 330. Processing stack 340 comprises complex mixer block 342, poly-phase IF filter block 344, channel qualifier 346, discriminator 348, and baseband processing 350. The processing stacks 320 and 340 may incorporate identical blocks as illustrated in FIG. 3, or may include completely different blocks as may be required to support different protocols enabled within the active DW-SRS applications. In addition, additional stacks may be incorporated into the architecture 300 as may be needed to expand the SRS beyond the two-channel embodiment shown in FIG. 3.

A spectral representation 308 of the signal at the output of DMA block 306 is shown that contains two desired signals that have been mixed down to offsets from the main IF frequency as has been previously described for FIG. 2. The sampling rates and associated filtering are designed to incorporate a bandwidth appropriate for this composite signal. In an example of a preferred embodiment, the offsets are chosen to minimize interference and aliasing components, such as +32.5 kHz and −65 kHz for a first and second desired IF signal respectively. The waveform representing two FM modulated signals, the first and second desired signals modulated with 600 Hz and 1 KHz tones respectively, as shown in 308, where the normalized IF "reference" frequency of 150 kHz is indicated by a solid vertical line for illustrative purposes only.

Blocks 322 and 342 of FIG. 3 provide complex mixing stages for each desired channel. These stages shift the complex IQ sampled received signals of the composited signal from the output of DMA 306 so as to align the appropriate received IF signal channel to its designated baseband channel for subsequent demodulation. Spectral response 323 illustrates the frequency offset shift of +65 kHz at the output of mixer 322 so as to shift the second desired IF signal to its designated baseband channel, and spectral response 343 illustrates the frequency offset shift of −32.5 kHz at the output of mixer 342 so as to shift the first desired IF signal to its designated baseband channel. For illustrative purposes, the spectral reference frequency of the x-axis is highlighted at 150 kHz for spectral response 308, 323 and 343. Following blocks 322 and 342, each channel performs a second IF filter and down sampling per system requirements at blocks 324 and 344 respectively.

System channel qualification is provided for in FIG. 3 blocks 326 and 346. This may take the form of carrier detection, squelch detection, AFC netting error determination, sync detection, etc. depending upon the individual system needs. Discriminator blocks 328 and 348, along with baseband processing blocks 330 and 350 respectively, recover the first and second information signal modulated onto the two sampled received signals and provides for filtering and other system requirements for conditioning the recovered signal, based on individual system needs. Time domain dual-demodulated signal response 372 represents the tandem demodulated audio output from baseband signal processing blocks 330 and 350 that may be ported to the radio speaker from summation block 362 as may be desired by the end user.

Signal arbitration block 362 is provided to control the output signal from the parallel processing stacks 320 and 340. For systems where both channels are analog, the demodulated output is a pair of analog audio waveforms that are, in turn, routed to different post processing blocks, or may be combined into a single signal, etc. by signal arbitration block 362. In a digital system, the arbitration block 362 can be used to establish an IP data connection, video link or other data connection as may be desired.

The stack configuration arbitrator block 360 is used to control the overall multi-channel processing system so the protocol stacks work together or can be configured for other operational requirements. For instance, parallel processing stacks 320 and 340 may be configured as either data stacks, analog stacks or a combination thereof, and each stack may independently parallel process an uncorrelated received signals, or alternatively each stack may be configured to work synchronously to process a common received signal, wherein each stack processes a portion of the single received signal so as to increase total system bandwidth for increased data throughput. Also, when running independent protocol stacks, some operational conflicts may arise if single software resource is accessed by both stacks at the same time resulting in resource contention. In TDMA data systems, for example, the receive operation of both stacks can be controlled to minimize interruptions due to inbound registrations requirements. Another example would be the need to temporarily disable the receive processing of one stack if the other stack is required for transmit operation. In addition to solving resource contention, the arbitrator block 360 may communicate useful information decoded from one stack to the other. For example, a first stack 320 may be processing a signal representing a user registered on a primary system, while the second stack 340 is scanning secondary systems for signal quality or other metrics. Therefore, the first stack 320 is not required to perform mobility scans (i.e. no longer needs to search for other systems when roaming is engaged), but may instead receive pertinent information from the second stack 340 via the arbitrator block 360, which is in communication with the second stack. Thus, arbitrator block 360 utilizes knowledge of the channels' protocol configurations as acquired by the stacks to enhance performance on both channels, as opposed to cognitive radio technologies where the protocols do not interact by design.

Figure 4:
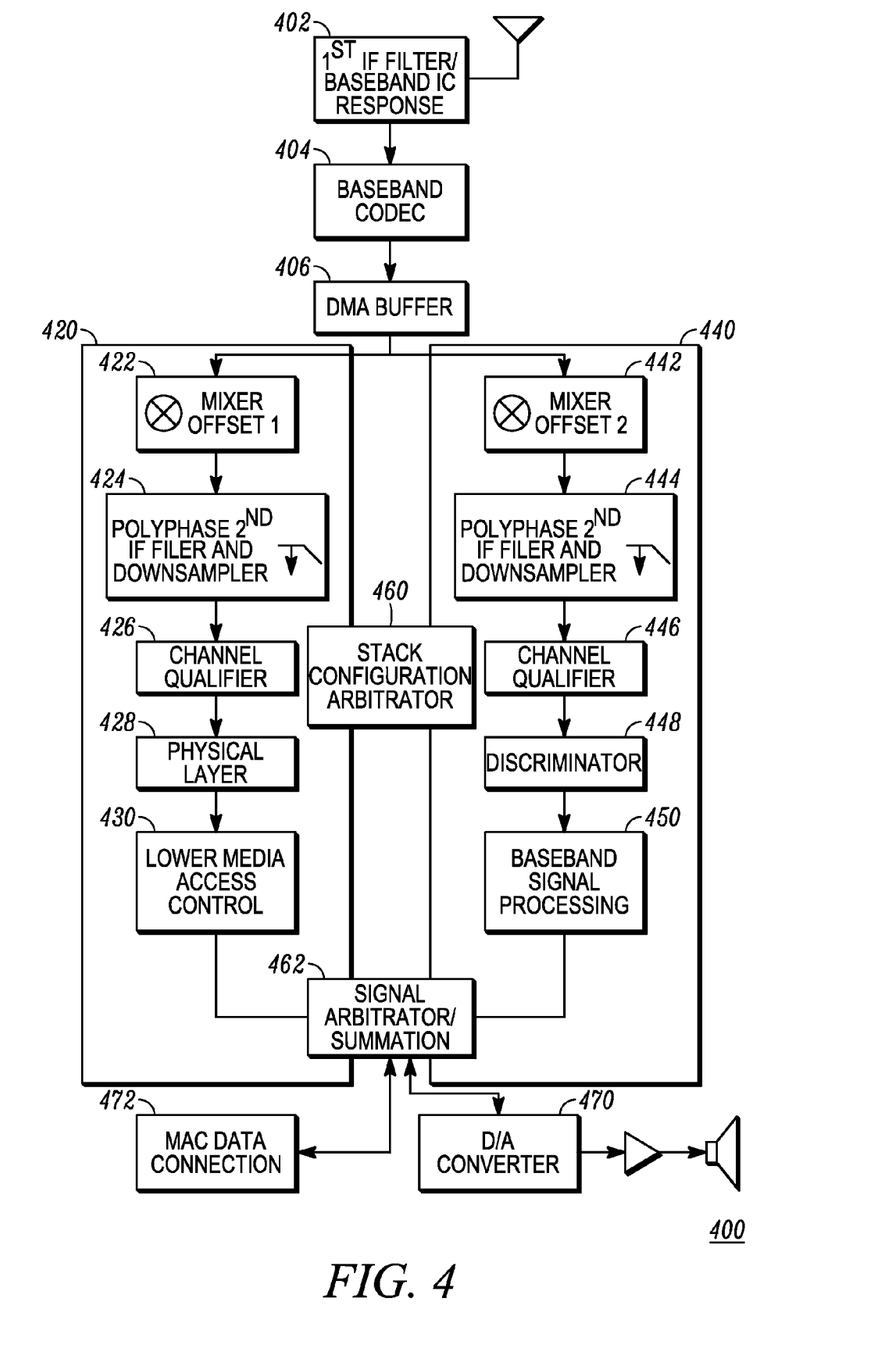
FIG. 4 illustrates the received signal differentiation within the parallel software processing systems.

FIG. 4 illustrates another embodiment where processing stack 420 is different from processing stack 440. For FIG. 4, a mixed mode receiver is shown where stack 420 may support a digital protocol that is uncorrelated to the processing of an analog FM signal being processed in stack 440. In this type of mixed mode receive configuration, unique issues of synchronizing access to shared software resources may arise due to the asynchronous processing relative to the variant protocols of stacks 420 and 440. Specifically, such a configuration can cause analog FM audio disruptions (audio holes) within stack 440 which may be noticeable to the user for periods when registration acknowledgments for the digital protocol is being processed for stack 420. Registration acknowledgements for the radio may be required on set intervals within a TDM system, synchronized to an outbound control channel as may be required for the digital protocol being processed by stack 420. For this example, the TDM data connection for processing stack 420 may be configured such that any requests for connecting the media access control (MAC) data connection block 472 to lower MAC (LMAC) block 430 through signal arbitrator block 462 will be delayed until higher priority audio processing of the analog demodulated signal from baseband processing block 450 of stack 440 is completely processed through same arbitrator block 462. In this manner, contention of the shared resource arbitration block 462 allows for uninterrupted audio to the speaker of FIG. 4, while still supporting non-time critical, lower priority digital processing sub-routines, such as registration acknowledgements to MAC block 472. As is apparent to those skilled in the art, other configurations of mixed mode receive operation may be realized so as to support divergent protocol requirements, where prioritization of shared processing resources may be required to facilitate proper SRS operation. These alternative configurations are incorporated herein without departing from the novelty of the present invention.

Figure 5:
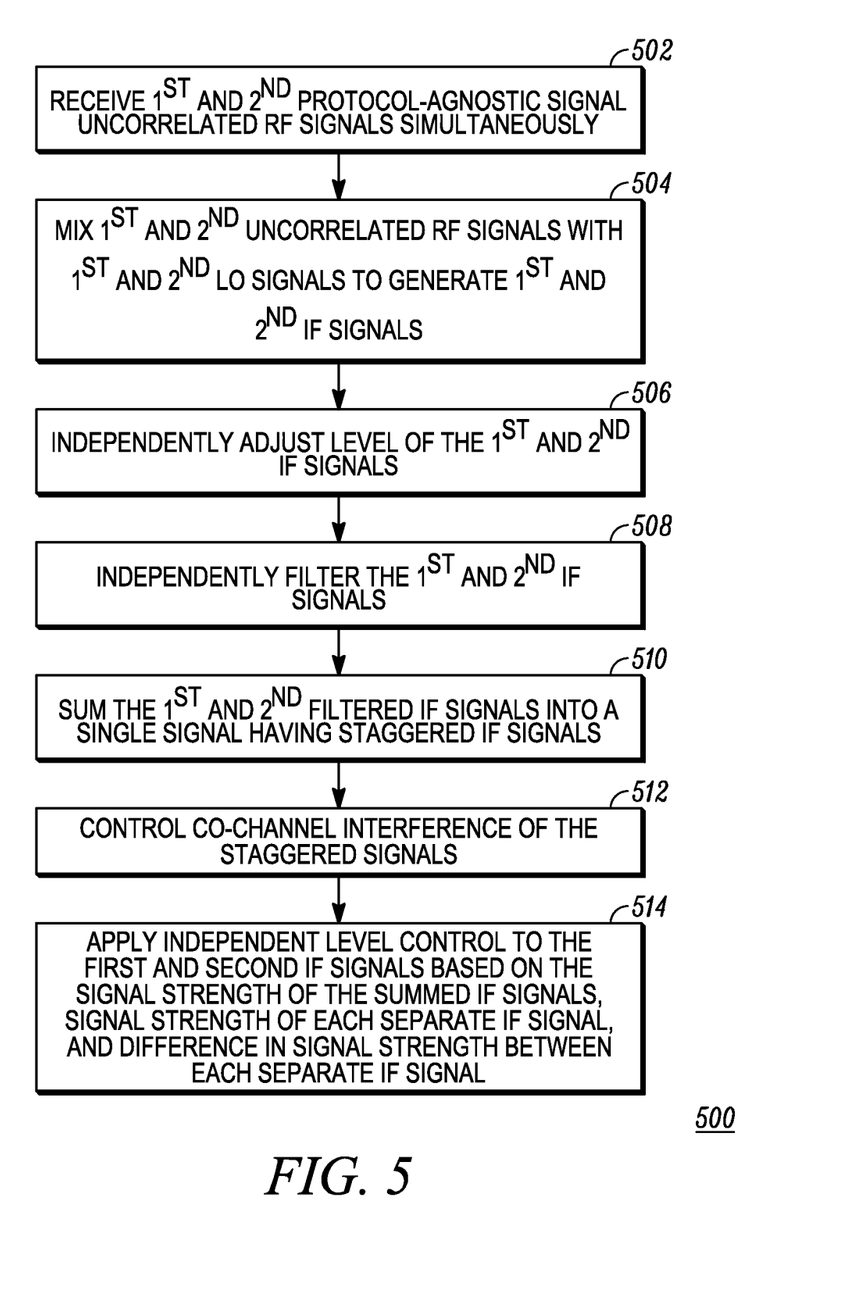
FIG. 5 illustrates the methodology for the DW-SRS architecture wherein independent level control of the first and second IF signals is accomplished.

Referring to FIG. 5, there is shown a flowchart summarizing a method 500 for receiving radio signals in accordance with the various embodiments. While described in terms of first and second signals, the method extends beyond two received signals. The method 500 begins at 502 by receiving first and second protocol agnostic uncorrelated RF signals simultaneously. The first and second protocol agnostic uncorrelated RF signals are mixed at 504 with first and second LO signals respectively to generate first and second IF signals, followed by 506, which independently level controls (via gain or attenuation adjustments) the first and second IF signals to generate first and second level controlled IF signals. The first and second level controlled IF signals are independently filtered at 508 into first and second filtered IF signals. At 510, the first and second filtered IF signals are summed into a single signal having staggered IF signals, wherein co-channel interference of the staggered IF signals is controlled at 512 to avoid co-channel interference. Any co-channel interference is controlled at 514 by applying independent attenuation to the first and second IF signals based on the signal strength of summed IF signals, the signal strength of each separate IF signal and the difference in signal strength between each separate IF signal.

Receiver 100, software architectures 300, 400 and method 500 provide embodiments for simultaneous demodulation of two receive channels using a single ADC 4, thereby minimizing product size while still meeting mission critical radio receiver specifications. Receiver 100 can be adapted to support dual conversion intermediate frequency (IF), very low IF (VLIF), or direct conversion receiver (DCR) topologies to allow simultaneous reception of two receive signals. Processing strategies for minimizing co-channel interference and adaptively adjusting the amplitudes of signals IF1 and IF2 interpedently to mitigate interference have been provided, where IF selectivity blocks 38 and 39 serve to attenuate undesired spurious response signals that may be spectrally proximate with desired signal IF1 and IF2 respectively. In addition, LO injection signals 18 and 28 may be adjusted to further minimize co-channel interference so as to maximize desired on-channel signal SNR. Strategies for parallel processing of two uncorrelated received signals have thus been provided. The dual channel receiver 100 provided by the various embodiments provides for mission critical and Professional Consumer Radio (PCR) two SRS that support receiving one RF signal modulated with a first information set (e.g. for voice) and simultaneously receiving a second RF signal on a second RF channel modulated with a second information set uncorrelated to the first information set (e.g. data).

Scan strategies have been described which eliminate audio holes which facilitates monitoring of a higher priority receive signal without degrading the user experience while continuously monitoring a non-priority channel. The dual channel receiver 3 of receiver 100 allows seamless switching between audio and data channels when a desired RF signal is known to be present. The architecture allows simultaneous voice and data applications—listening to audio and while simultaneously monitoring location, web application, and mission critical data. For trunked systems, the receiver 100 allows for simultaneous monitoring of control channel and voice channel. The system can thus be applied to systems utilizing voice channel which are talk-around or trunked voice. Legacy gateway architectures can now be simplified by eliminating one of the two receiver channels typically implemented in many of today's products.

Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

In the description herein, numerous specific examples are given to provide a thorough understanding of various embodiments of the invention. The examples are included for illustrative purpose only and are not intended to be exhaustive or to limit the invention in any way. It should be noted that various equivalent modifications are possible within the spirit and scope of the present invention. One skilled in the relevant art will recognize, however, that an embodiment of the invention can be practiced with or without the apparatuses, systems, assemblies, methods, components mentioned in the description.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the sequence of steps in a flow diagram or elements in the claims, even when preceded by a letter does not imply or require that sequence.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, various embodiments can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A receiver for a wireless communication device, the receiver comprising:
   a dual path receiver receiving first and second protocol-agnostic, uncorrelated receive signals simultaneously;
   the dual path receiver generating first and second offset intermediate frequency (IF) signals from the simultaneously received first and second protocol-agnostic, uncorrelated receive signals;
   at least one converter for converting the first and second offset IF signals into at least one serial synchronous interface (SSI) signal representing the first and second offset IF signals; and
   a processor for receiving the at least one SSI signal and applying parallel processing paths to demodulate the at least one SSI signal into separate baseband signals, the processor providing interference detection of, and level control for, the first and second offset IF signals; and the dual path receiver operating in a trunked mode system, wherein one path monitors control channel activity of a first trunked system while a second path simultaneously performs a scan mode.

2. The receiver of claim 1, wherein the receiver is at least one of a direct conversion receiver, a dual conversion receiver, or a combination of dual and direct receiver.

3. The receiver of claim 1, wherein the simultaneously received first and second protocol-agnostic, uncorrelated receive signals originate from separate antennas or separate frequencies.

4. The receiver of claim 1, further comprising:
   a summer for combining the first and second offset IF signals into combined intermediate Frequency (CIF) signal covering a CIF spectrum incorporating both the first and second offset IF signals; and
   the least one converter comprises a single analog-to-digital (A/D) converter for converting the CIF signal into the SSI signal.

5. The receiver of claim 1, wherein the at least one converter comprises:
   a first analog-to-digital (A/D) converter for sampling the first IF signal to generate a first SSI signal and a second A/D converter for sampling the second IF signals to generate a second SSI signals.

6. The receiver of claim 1, wherein the processor comprises:
   a plurality of filters for providing selectivity in separate IF paths so as to detect the presence of an interferer within an IF path, and in response to detecting the presence of a strong signal interferer proximate to one IF path, the processor applying an appropriate level control to optimize receive performance in the other IF path; and
   a plurality of automatic gain (AGC) controllers to control attenuation and gain of the first and second offset IF signals.

7. The receiver of claim 1, wherein the processor provides signal arbitration to manage the separate baseband signals.

8. The receiver of claim 1, wherein the parallel processing of the processor comprises:
   parallel processing stacks for processing the separate baseband signals; and signal arbitration to manage the separate baseband signals.

9. The receiver of claim 1, wherein the dual path receiver provides simultaneous multi mode operation, wherein one path of the dual path receiver receives digital modulated signals while another path of the dual path receiver simultaneously receives analog modulated signals.

10. The receiver of claim 1, wherein the dual path receiver operates in a trunked mode system, wherein one path of the dual path receiver monitors control channel activity while another path of the dual path receiver simultaneously demodulates analog or digital information sets from the second received signal.

11. A receiver for a wireless communication device, the receiver comprising:
    a dual path receiver receiving first and second protocol-agnostic, uncorrelated receive signals simultaneously;
    the dual path receiver generating first and second offset intermediate frequency (IF) signals from the simultaneously received first and second protocol-agnostic, uncorrelated receive signals;
    at least one converter for converting the first and second offset IF signals into at least one serial synchronous interface (SSI) signal representing the first and second offset IF signals; and per amendment on tif 194, indent line 10 of this claim a processor for receiving the at least one SSI signal and applying parallel processing paths to demodulate the at least one SSI signal into separate baseband signals, the processor providing interference detection of, and level control for, the first and second offset IF signals; wherein the parallel processing provided within the processor comprises:
    a first path having first and second parallel bandpass filters in which the first bandpass filter of the first path has a wider passband than the second bandpass filter of the first path;
    a second path having first and second parallel bandpass filters in which the first bandpass filter of the second path has a wider passband than the second bandpass filter of the second path;
    a first received signal strength indicator (RSSI) coupled to the wider bandpass filters of the first path;
    a second received signal strength indicator (RSSI) coupled to the wider bandpass filter of the second path; and first and second automatic gain controllers coupled to the first bandpass filters of the first and second path respectively, and simultaneously being coupled to the first and second RSSI respectively.

12. A receiver for a wireless communication device, the receiver comprising:
a multi-channel receiver providing simultaneous reception of a plurality of desired signals, each desired signal occupying a designated desired channel, each desired channel having a desired channel spacing, wherein each desired channel is governed by a plurality of protocols, each protocol being agnostic to, and independent of, other protocols that govern other desired channels within the multi-channel receiver, the multi-channel receiver generating a plurality of intermediate frequency (IF) signals, each IF signal being associated with a specific desired channel;
a plurality of IF paths for processing the plurality of IF signals, each IF path having a unique desired IF frequency, each IF path being independent of the other IF paths, each IF path incorporating at least one IF filter and at least one IF automatic gain control (IF AGC);
a frequency difference between any given pair of desired IF frequencies being different from the other desired IF frequencies by an amount proportional to a non-integer multiple of the desired channel spacing, thereby minimizing interference from channels proximate to other desired IF frequencies contained within the plurality of IF paths; and
the IF AGC for each IF path being controlled independently for level controlling the plurality of IF signals.

13. The receiver of claim 12, wherein the at least one IF level control comprises separate received signal strength indicators (RSSI) and AGC control for each of the plurality of IF signals.

14. The receiver of claim 13, wherein the plurality of IF signals are converted to a plurality of baseband signals via parallel processing stacks in which a signal arbitrator manages contentions amongst the plurality of baseband signals.

15. A method of receiving radio signals, comprising:
receiving a plurality of protocol-agnostic, uncorrelated receive signals simultaneously;
mixing the plurality of protocol-agnostic, uncorrelated receive signals with a plurality of associated LO signals so as to generate a plurality of intermediate frequency (IF) signals, each of the plurality of IF signals being frequency offset with respect to each other;
independently level controlling the plurality of IF signals to generate a plurality of level controlled IF signals;
independently filtering the plurality of level controlled IF signals into a plurality of filtered IF signals;
determining the independent level controlling based on a signal strength of each separate IF signal contained in the plurality of IF signals, and in relation to a difference in signal strength between each separate IF signal of the plurality of IF signals;
demodulating the plurality of filtered IF signals into a plurality of baseband signals; and applying the determined independent level controls to the plurality of IF signals.

16. The method of claim 15, wherein prior to determining the independent level controlling, the plurality of filtered IF signals are summed into a single signal having frequency offset IF signals.

17. The method of claim 15, wherein prior to the step of determining the independent level controlling, the plurality of filtered IF signals are independently sampled by a plurality of analog-to-digital converters.

18. The method of claim 15, further comprising within the step of determining the independent level controlling:
detecting a presence of an interferer within a plurality of IF paths;
in response to detecting the presence of a strong interferer in one IF path, applying predetermined attenuation to optimize performance in the other IF paths.

19. The method of claim 15, further comprising arbitrating signal management between the plurality of baseband signals.

* * * * *